United States Patent [19]

Leitmeier et al.

[11] Patent Number: 5,027,645
[45] Date of Patent: Jul. 2, 1991

[54] MEASURING DEVICE FOR DETERMINING DISTANCE

[75] Inventors: Klaus Leitmeier; Gerhard Wöss; Rudolf Zeiringer, all of Graz, Austria

[73] Assignee: AVL Gesellschaft für Verbrennungskraftmaschinen und Messtechnik m.b.H., Graz, Australia

[21] Appl. No.: 391,508
[22] PCT Filed: Nov. 23, 1988
[86] PCT No.: PCT/AT88/00101
§ 371 Date: Jul. 21, 1989
§ 102(e) Date: Jul. 21, 1989
[87] PCT Pub. No.: WO89/05447
PCT Pub. Date: Jun. 15, 1989

[30] Foreign Application Priority Data

Nov. 30, 1987 [AT] Austria ................................ 3143/87

[51] Int. Cl.⁵ .......................................... G01M 15/00
[52] U.S. Cl. ................................................. 73/116
[58] Field of Search .............. 73/116, 718, 724, 118.1; 324/661, 662, 676, 677, 678

[56] References Cited

U.S. PATENT DOCUMENTS

| | | |
|---|---|---|
| 3,852,887 | 12/1974 | Hennrick . |
| 3,898,562 | 8/1975 | Mizikar et al. . |
| 4,147,054 | 4/1979 | Hohenberg et al. . |
| 4,165,483 | 8/1979 | Holdren et al. . |
| 4,289,035 | 9/1981 | Lee ........................................ 73/718 |
| 4,296,629 | 10/1981 | Vuyovich . |
| 4,481,465 | 11/1984 | Fredericks et al. . |
| 4,584,885 | 4/1986 | Cadwell .............................. 324/662 |

*Primary Examiner*—Robert Raevis
*Attorney, Agent, or Firm*—Watson, Cole, Grindle & Watson

[57] ABSTRACT

To improve the measuring sensitivity of a measuring device to determine the distance between an electrically conducting part, which can be moved in a defined chamber, and a reference point, in particular to determine the upper dead point of the piston of an internal combustion engine, with an electronic evaluation circuit, in which a capacitive sensor can be positioned in a holding device, held in the wall of the chamber, and is connected to an evaluation circuit, the invention provides that the evaluation circuit has a measuring bridge, fed by an oscillator by means of output potential dependent switching elements, with at least two capacitors, that the sensor head of the sensor and the movable part, in particular the piston of the internal combustion engine form one of the two capacitors, and that there is a differential amplifier to which the transverse voltage, which can be picked off the measuring bridge, can be led, and that the outputs of the differential amplifier control the output potentials of the potential-dependent switching elements.

7 Claims, 4 Drawing Sheets

MEASURING DEVICE FOR DETERMINING DISTANCE

BACKGROUND OF THE INVENTION

1. Field of the Invention

The invention relates to a measuring device to determine the distance between an electrically conducting part, which can be moved in a defined chamber, and a reference point, in particular to determine the upper dead point of the piston of an internal combustion engine, with an electronic evaluation circuit in which a capacitive sensor can be positioned in a holding device, held in the wall of the chamber, and is connected to an evalution circuit.

2. The Prior Art

In a known measuring device of the aforementioned kind one electrode is isolated in the combustion chamber of an internal combustion engine, the piston or the cylinder block forming the second electrode. Depending on the distance of the piston from the electrode, the capacitance of this system changes. In well-known cases, the change in capacitance is now evaluated in such a manner that said evaluation influences the modulation of a carrier frequency for which a relatively complicated evaluation circuit is necessary.

Due to this principle of measurement, the well-known system has proven to be relatively insensitive to small changes in capacitance and also exhibits a poor signal to noise ratio. In addition to this, one must work with relatively large sensors, resulting in the necessity of providing matching measurement openings, which permit the electrode to be inserted.

The object of the invention is to avoid the above drawbacks and to propose a measuring device of the aforementioned kind, which in particular can be used in a simple manner in conventional internal combustion engines and is characterized by a high degree of sensitivity.

SUMMARY OF THE INVENTION

The invention achieves this object in that the evaluation circuit has a measuring bridge, fed by an oscillator via output potential dependent switching elements, with at least two capacitors, that the sensor head of the sensor and the movable part, in particular the piston of the internal combustion engine form one of the two capacitors, that there is a differential amplifier to which the transverse voltage, which can be picked off the measuring bridge, can be led, and that the outputs of the differential amplifier control the output potentials of the potential-dependent switching elements. A measuring device with the evaluation circuit of the invention contributes significantly to the improvement of the measurement system, primarily with respect to the evaluation of small, rapid changes in capacitance. Without any loss in sensitivity, smaller, thinner sensors can be used that can be inserted into existing openings provided for measuring sensors, fuel injection nozzles, spark or heater plugs.

In the case of the evaluation circuit of the invention, a measuring bridge, for example, a capacitance bridge, is fed by an oscillator with square wave pulses via output potential dependent switching elements. When a capacitance changes, the result is a changed ratio of voltage division in the series connection of the capacitances in question. The result in turn is a change in the transverse bridge voltage. Said change causes, via a differential amplifier, a change in the output voltage and a change in the potential that adjusts the size of the incoming pulses via the switching elements to the new capacitance ratio. Thus the smallest differences in the bridge arms lead to relatively large changes during the charge transfer during the discharging of the capacitors of the bridge, the result of which is a high sensitivity of the evaluation circuit. The evaluation circuit can be designed by correspondingly sizing the capacitors of the bridge in such a manner that said capacitors rapidly recharge themselves and can, thus, function at a relatively high frequency of the signals of the oscillator so that the sensor can determine the exact point in time when the closest approach occurs. This is very important, for example, in determining the upper dead point of a piston of an internal combustion engine.

Another advantage of the proposed evaluation circuit lies in its very simple construction. It can also be provided that the potential-dependent switching elements are formed by means of diodes, which are connected in series to the two bridge arms of the measuring bridge, each bridge arm having two capacitors.

Finally, the measuring device of the invention can be applied universally, since a bridge arm of the measuring bridge is equipped with a capacitor of variable capacitance to balance the static capacitance of the measuring device.

In conventional measuring devices the electrode or sensor is set in such a manner that contact due to the movable part or piston may be ruled out, but setting a precisely defined, minimum distance, which is important for the sensitivity of measurement, is possible only with difficulty. This problem is solved with further development of the invention in that the holding device, interpenetrated by the sensor, has a clamping piece, which can be positioned in a wall of the chamber and which is equipped with a face as a stop for a spacer, which can be positioned at the sensor, wherein the face or the surface of the spacer, which can be made to abut said face, has at least parts of a substantially helical surface, whose axis coincides with the longitudinal axis of the sensor.

With these measures it is possible to position the sensor in a simple manner, for example, in the opening provided for a transducer, an injection fuel nozzle, spark or heater plug, in which position the sensor comes near the upper dead point, but contact of the sensor with the piston of the internal combustion engine is ruled out. Thus, if a piston is in the upper dead point, the sensor with the measuring design of the invention can be guided to said piston just up to the point of contact, the spacer abutting the clamping piece in order to position the clamping piece with respect to the sensor so that subsequently the desired distance of the sensor from the upper dead point is set by rotating the sensor with respect to the spacer.

Moreover, the invention provides that the clamping piece and preferably the spacer as well have a collet enclosing the sensor, and a clamping nut that interacts with said collet, so that a corresponding positioning between the sensor and the spacer or the clamping piece can be produced in a simple manner.

With respect to a simple and readily repeatable adjustment of the sensor, it can also be provided that one of the surfaces of the clamping piece and of the spacer, facing each other and orthogonal to the axis of the sensor, has a projecting lug and the other surface provided to receive said lug has depressions, preferably slots of variable depth, distributed in the circumferential direction, the height of the lug matching at least the depth of the deepest depression. This facilitates in a very simple manner the maintenance of the pre-determined spacing values. However, it is also quite possible to provide a surface on one of the two parts that is continuously helical over one revolution so that in one such case an arbitrary value, ranging from zero to the degree to which the helical surface has increased, can be adjusted by correspondingly rotating the sensor.

Another embodiment of the invention provides that the clamping piece has a threaded lug, which can be screwed into an adapter that can be fastened in the spark plug or fuel injection nozzle bore of the cylinder head. In this manner the sensor can be used universally and it is only required that adapters that are simple to manufacture be used in order to fit the sensor to the respective bore or to seal said bore with respect to the sensor.

The invention is explained in detail with reference to the drawings.

DETAILED DESCRIPTION OF THE PREFERRED EMBODIMENTS

Figure 1:
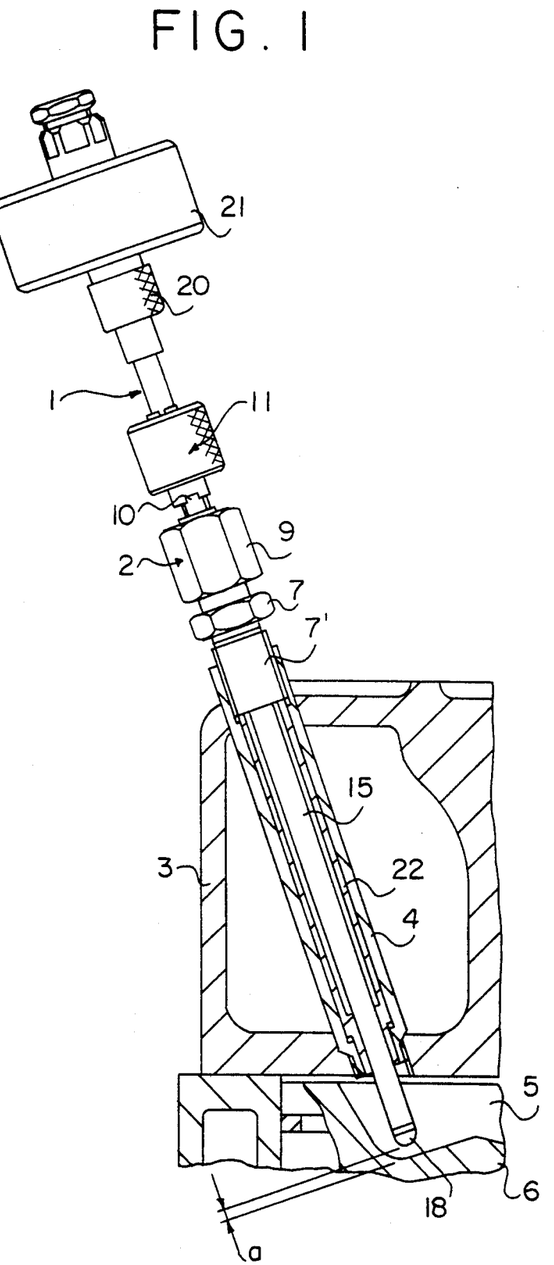
FIG. 1 shows a sensor of the measuring device of the invention in the assembled state.
Figure 2:
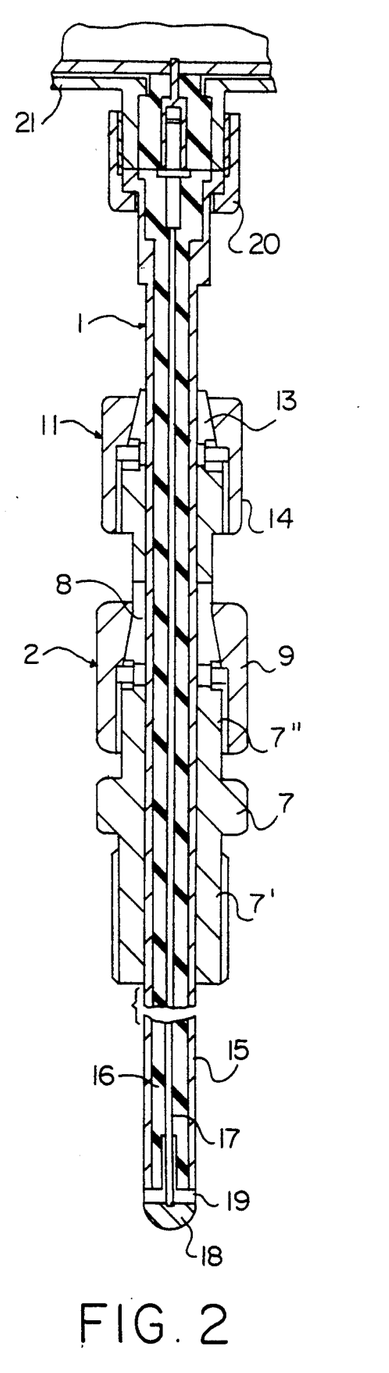
FIG. 2 is a sectional view of the sensor of the measuring device and the mounting.
Figure 3:
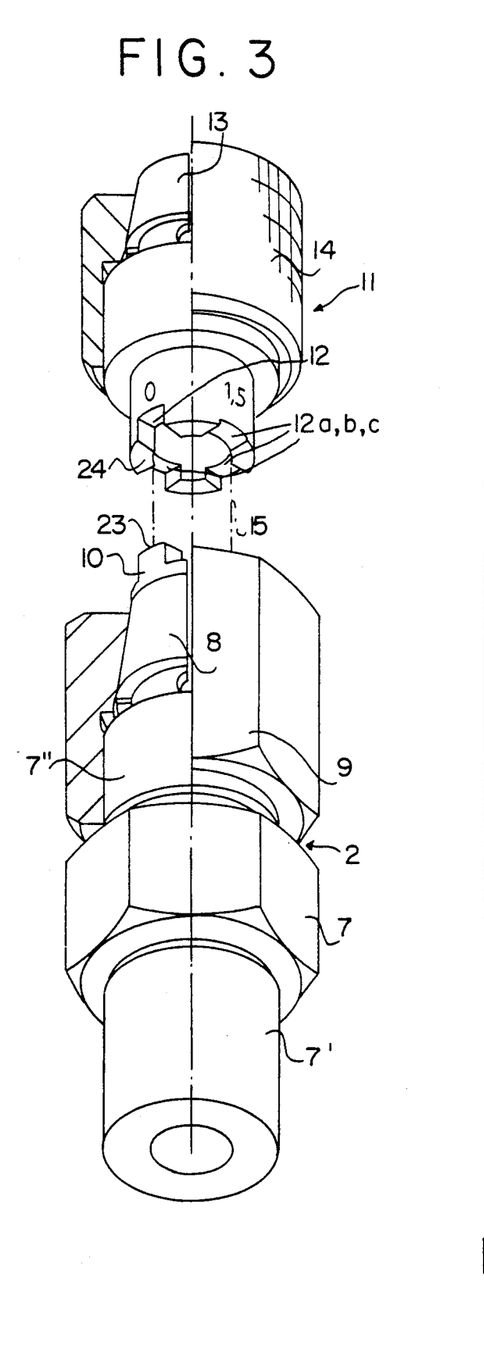
FIG. 3 is an isometric detail drawing of the mounting.

As FIGS. 1 to 3 show, the sensor 1 of the measuring device interpenetrates a clamping piece 2, which in turn is held in a mounting 4, which penetrates a cylinder head 3 of an internal combustion engine and which is provided, e.g., for a transducer. The sensor 1 itself projects into the chamber 5, the combustion chamber of the internal combustion engine, in which a piston 6, which can have a combustion well, is held axially movable in the conventional manner.

The clamping piece 2 has a threaded coupling 7 with whose threaded lug 7' said clamping piece can be screwed into the mounting 4 so that said threaded coupling 7, opposite the threaded lug 7', has a threaded section 7" and a collet B with which the sensor 1 can be clamped with the aid of the clamping nut 9. An intermediate adapter 22, which simultaneously brings about the necessary seal and encloses the sensor 1, is located in the mounting 4.

The collet 8 has on its face 23, opposite the threaded section 7" a projecting lug 10. This lug 10 extends into one of the radial slots 12, 12a to 12c, which is designed on the face 24 of a spacer 11, facing the collet 8, and which has varying depth and whose base sections have at least parts of a surface that is essentially helical.

The spacer 11 also has at its disposal a collet 13 with which said spacer can be clamped to the sensor 1 by means of the clamping nut 14.

As FIG. 2 shows, the sensor 1 comprises essentially a pipe 15, made of an electrically conducting material, in which pipe an electrically conducting core 17, enclosed with insulation 16, is guided. This core 17 conducts electricity and is connected to a sensor head 18, which is insulated against the end of the pipe 15 by means of an insulating piece 19. A pulse train is run from the evaluation circuit, arranged in a housing 21, to the core 17 of the sensor 1 via the attachment plug 20. The piston 6, which is connected to the pipe 15 of the sensor 1 via the cylinder block, the clamping piece 2 and the mounting 4 so as to conduct electricity, is thus connected to ground potential. Thus the sensor head 18 and the piston 6 act as electrodes of a capacitor, the capacitance of said capacitor being a function of the distance of the piston from the sensor head 18.

The sensor head 18 can be set with respect to the upper dead point of the piston 6 in a very simple manner. First, the piston 6 is brought to its upper dead point and, when the collet 9 is disengaged, the sensor head 18 is put on the piston 6, or before the piston 8 reaches the upper dead point, the sensor head is put on said piston and said piston is brought with the mounted sensor 1 to its upper dead point, the collet 9 automatically disengaging itself.

When this position has been reached, the spacer 11, whose collet 13 is also disengaged, abuts the face of the collet 8 so that its lug 10, projecting on the face side, extends into the deepest slot 12 of the spacer 11. The height of the lug 10 is chosen at least equal to the depth of the deepest slot 12 of the spacer 11. In this position of the spacer 11, its collet 13 is clamped to the sensor 1 by tightening the clamping nut 14 and with said sensor is pulled a short distance out of the clamping piece 2 and, after rotating the spacer 11, is pushed in again into it. Now the lug 10 locks into one of the less deep slots 12a to 12c of the spacer 11.

Depending on which the slots 12a to 12c the lug 10 projects into, which slots have less depth e.g. by 0.5, 1.0 or 1.5 mm than the deepest slot 12, the result is a corresponding distance a of the sensor head 18 from the upper dead point of the piston 6 so that the sensor head cannot make contact with the piston 6 in dynamic operation in which, compared to the position of the static, upper dead point, the position of the upper dead point of the piston changes with respect to the cylinder head 3 due to the unavoidable slackness, bending, and inertial forces.

Finally, the position of the sensor 1 is fixed by tightening the clamping nut 9 of the collet 8 and the clamping piece 2. In this manner the position of the sensor 1 is fixed with respect to the cylinder head 3; and the upper dead point of the piston 6 can be determined by evaluating the capacitance of the capacitor formed by means of the sensor head and the piston 6, said capacitance changing as a function of the distance of the piston 6 from the sensor head 18, so that the maximum of the capacitance of this capacitor indicates that the upper dead point has been reached.

Figure 4:
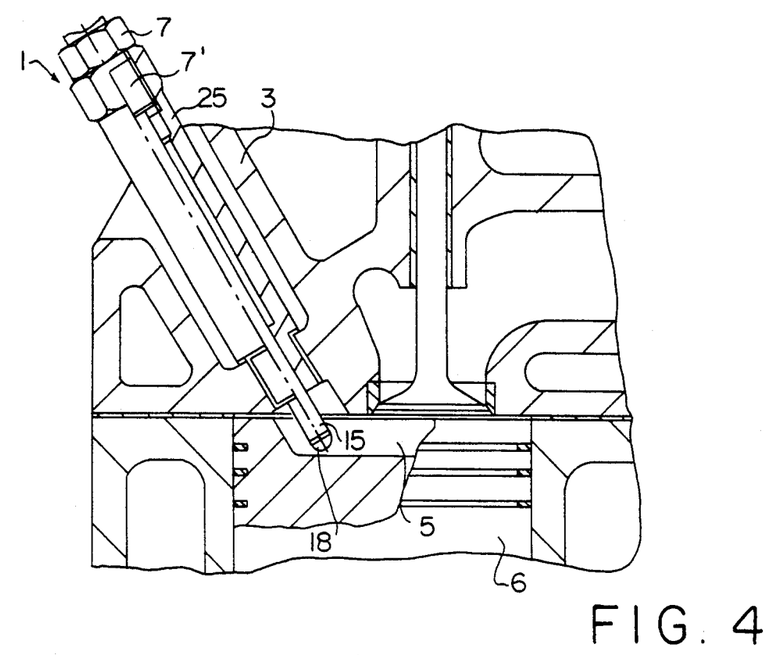
FIGS. 4 and 5 are variations of the embodiment of FIG. 1.
Figure 5:
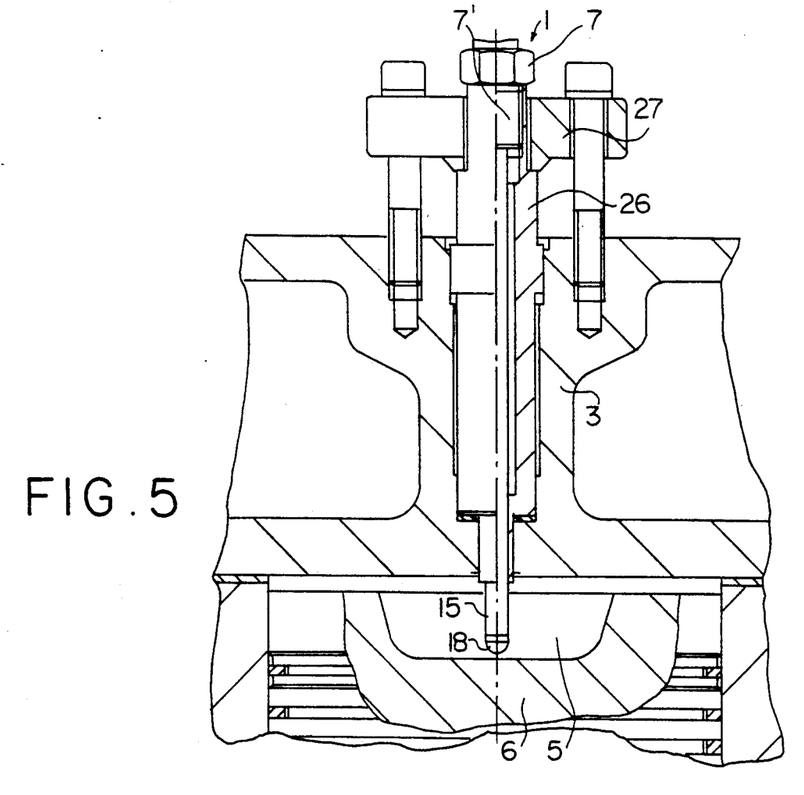

Of course, it is also possible to screw specially manufactured clamping pieces 2 with matching threaded lugs 7' into bores for spark plugs or fuel injection nozzles or, as shown in FIGS. 4 and 5, to use a correspondingly formed adapter 26, instead of the spark plug or instead of the injection nozzle, the adapter 26 being fastened by means of a mounting 27.

Figure 6:
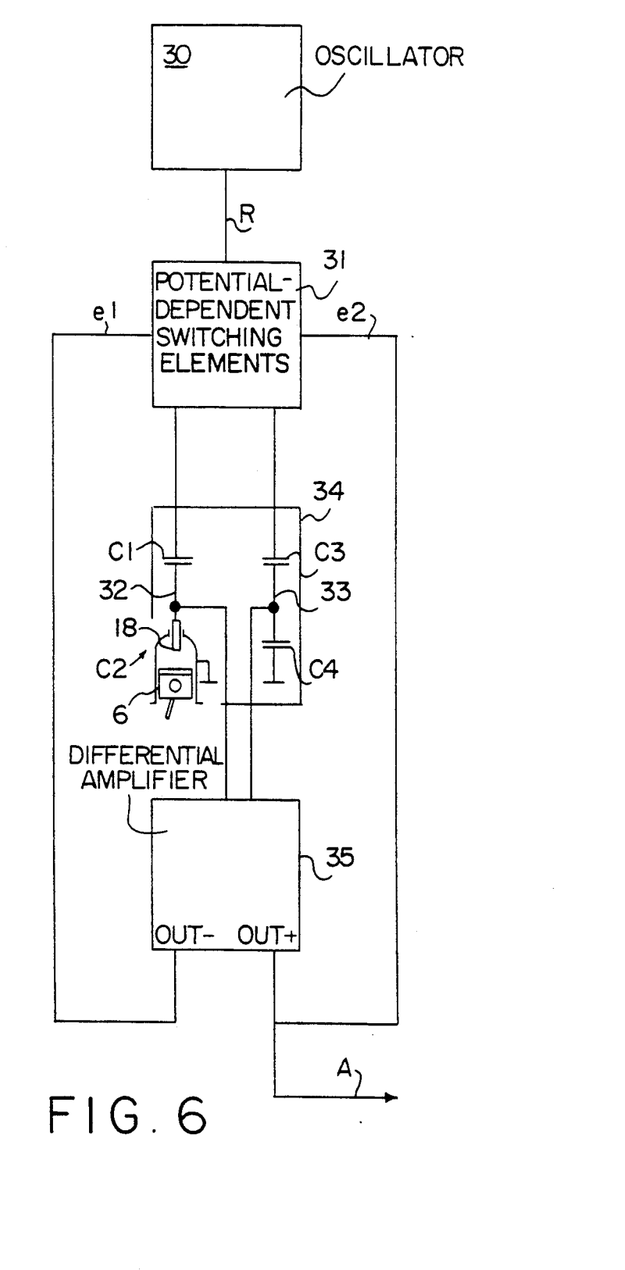
FIG. 6 is a block wiring diagram of the measuring device of the invention.

As FIG. 6 shows, the measuring device of the invention has in its evaluation circuit an oscillator 30, the output of which is connected to potential-dependent switching elements 31 and drives said switching elements with a train of square wave signals so that the potential at the potential-dependent switching elements 31 changes with a frequency pre-determined by the oscillator 30. The bridge arms 32, 33 of a measuring bridge 34 are fed via the switching elements that are dependent on the output potential.

The two arms of this measuring bridge 34 are formed, on the one hand, by the capacitors C1 and C2 and by the capacitors C3 and C4 wherein it is also conceivable to provide capacitors only in the half bridge 32. The inputs of the differential amplifier 35 are attached to the connecting points of the capacitors pairs C1 to C4 forming a bridge arm 32 or 33. The outputs of this differential amplifier 35 determine the reference potential of the potential-dependent switching elements 31 wherein one of these outputs of the differential amplifier 35 also yields the output signal A, which corresponds to the capacitance of the capacitor C2, which is formed by the sensor head 18 and the piston 6 and which can be tested in the usual manner for maximum points.

When the measuring device is being used, the two bridge arms 32, 33 of the measuring bridge 34 can be fed with square wave pulses of the oscillator 30 via the potential-dependent switching elements 31. At the same time the capacitors C1 to C4 are charged and then they are quickly discharged. When the measuring bridge deviates from the balanced state, which is the result when the capacitance of the capacitor C2, formed by the sensor head 18 and the piston 6, changes due to a change in the distance between these parts, the result is a change in the ratio of the voltage division in the bridge arm 32. The result is also a change in the transverse bridge voltage, which causes a change in the output voltage via the differential amplifier 35 and causes a change in the potentials e1 and e2 so that the size of the pulses, fed into the bridge 34, is adjusted to the new capacitance ratio via the potential-dependent switching elements 31 and the bridge is once again balanced. In this manner a high sensitivity can be ensured over a wide range.

Since the distance of the piston from the sensor head 18 changes constantly in an internal combustion engine during dynamic measurements, the output signal of the differential amplifier 35 also changes accordingly so that the extreme value of the distance between the sensor head 18 and the piston 6 at which value the capacitance of the capacitor C2, formed by the sensor head 18 and the piston 6, is the greatest, is determined in a simple manner.

Figure 7:
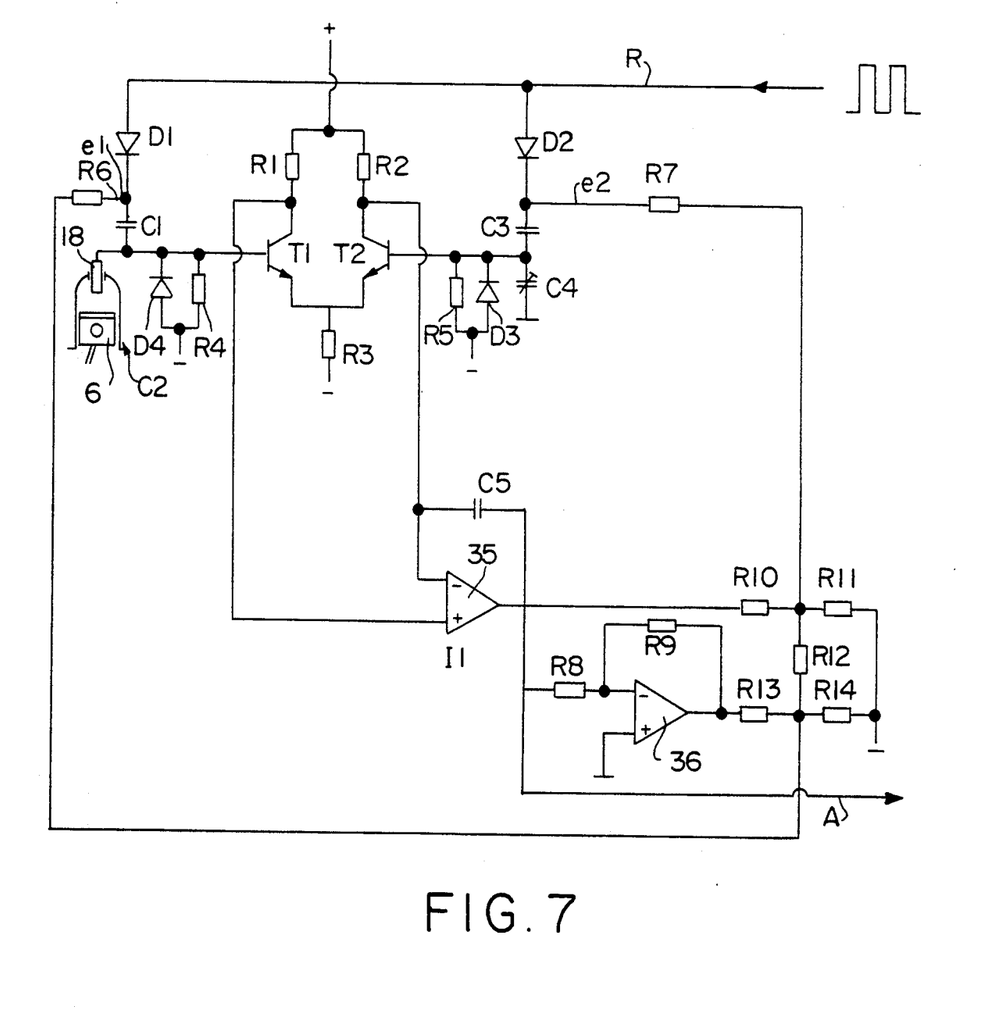
FIG. 7 is the wiring diagram of an evaluation circuit of the measuring device of the invention.

FIG. 7 shows an embodiment of an evalution circuit of the measuring device. In this evaluation circuit there are two bridge arms, which are formed by the capacitors C1, C2 or C3, C4, the capacitor C2 being formed by the sensor head 18 and the piston 6 and having a capacitance dependent on the distance between them.

One end of each of the two bridge arms is connected to a fixed potential, e.g. ground. The other ends of the two bridge arms are connected by means of the resistor R6 to a potential e1, or by means of the resistor R7 to a potential e2, these potentials being taken off via a network from the output voltage of the evaluation circuit. Moreover, these ends of the bridge arms are connected by means of the diodes D1 and D2 to an oscillator that is not illustrated here and that delivers a pulse train R, comprising square wave pulses, the diodes forming the potential-dependent switching elements 31.

The connection points of the two capacitors C1, C2 or C3, C4, each of which form one bridge arm, are connected to the bases of the two amplifying transistors T1, T2, combined into an integrated pair, the static capacitance being balanced by means of C4.

Furthermore, the connection points are connected to a fixed potential by means of the diodes D3, D4, with parallel resistors R4, R5; thus negative voltage peaks are avoided. The common emitter resistor R3 of the two transistors T1, T2 is also connected to this potential. Furthermore, the collectors of the transistors T1, T2 or the inputs of the differential amplifier 35 are connected to resistors R1, R2, which are connected to a fixed positive potential.

This circuit has two operating states: The first state, which hereinafter is referred to as normal position, occurs when the pulse input is "LOW". After a period of time in this state, almost no current flows into the capacitance bridge. The diodes D1 and D2 are in the cut-off state. The electrodes of C1 are connected to the potential e1; the electrode of C3 is connected to the potential e2. The potentials e1 and e2 are determined by means of the output voltage of the evaluation circuit and the setting of the network R8 to R14, which also contains an operational amplifier 36, acting as an inverter. The bridge center points, and thus also the bases of the two transistors T1, T2, are connected to the negative potential of a direct current source or by means of the resistors R4, R5. Since the emitters of the transistors T1, T2 are also connected by means of the resistors R3 to the same pole, the transistors T1, T2 block; and the positive potential is connected to the inputs of the differential amplifier. The second state of the circuit, which is hereinafter referred to as the active position, occurs when the pulse input is at "HIGH". "HIGH" means a voltage significantly more positive than the potential e1 or e2. The diodes D1 and D2 are, therefore, conducting. The electrodes from C1 and C3 increase to a voltage e3, e3 being a voltage that is lower by one diode forward voltage than the potential to be applied at the pulse input. Due to the steep positive edge of the input pulses, a relatively large current flows in a short period of time through the capacitance bridge C1, C2, C3, C4 and the bases of the two transistors T1, T2. The result of these base currents is increased collector currents through the resistors R1, R2, which cause the potentials to drop at the two inputs of the differential amplifier 35. The differential amplifier 35 is prevented from oscillating by the capacitor C5.

For the present it is assumed that C1 equals C3, and C2 equals C4, and e2 equals e1. In this case the charge transfers on both sides of the bridge are the same and the two transistors T1, T2 necessitate equal potential jumps as soon as they have become conducting due to a "High" signal to be applied at the pulse input.

If C2 and C4 are not equal, the differential voltage of the amplifier 35 causes e1 and e2 to change in such a manner that the measuring bridge 34 is again balanced.

Instead of diodes D1 and D2, transistors can also be used that are driven together with a pulse train—preferably comprising square wave pulses—at their bases in order to produce alternatingly a connection between the capacitors C1 or C3 and a fixed potential, whose height must, of course, be different from that of the potential e1 and e2.

It is possible with this evaluation circuit to detect quite rapidly very small changes in the capacitance of the capacitor C2, comprising the sensor head 18 or the piston 6; the result of which is very high resolution and very small changes in the distance can be detected.

It is possible to pre-set the sensitivity and the basic values of the potentials e1 and e2 by means of the resistor network R8 to R14 and the operational amplifier 36, which acts an inverter and is connected to the output voltage of the differential amplifier 35, the resistors R10, R11, R13, and R14 being responsible for said basic values.

We claim:

1. Measuring device to determine the distance between a movable piston of an internal combustion engine and the upper dead point of said movable piston, said measuring device comprising an electronic evaluation circuit, with a capacitive sensor being positioned in a holding device, and being connected to said evaluation circuit, wherein said evaluation circuit comprises a voltage measuring bridge, fed by an oscillator by means of output potential-dependent switching elements, having at least two capacitors, wherein a sensor head of said capacitive sensor and said movable piston form one of said two capacitors, said evaluation circuit further comprising a differential amplifier fed by a transverse voltage from said measuring bridge, and wherein outputs of said differential amplifier control the potentials of said potential-dependent switching elements.

2. Measuring device according to claim 1, wherein said potential-dependent switching elements are formed by means of diodes, which are connected in series to two bridge arms of said measuring bridge, each of said bridge arms having two capacitors including said at least two capacitors.

3. Measuring device according to claim 2, wherein one of said two capacitors in one of said bridge arms of said measuring bridge is equipped with a capacitor of variable capacitance to balance a static capacitance of said measuring device.

4. Measuring device according to claim 1, wherein said holding device has a clamping piece, which is positionable in a wall of said defined chamber and which is equipped with a face as a stop for a spacer fixed at said sensor, said spacer comprising a surface adjacent to said face, wherein said face or said surface of said spacer has at least parts of a substantially helical surface, the axis of said helical surface coincides with the longitudinal axis of said sensor.

5. Measuring device according to claim 4, wherein said clamping piece and said spacer both comprise a collet enclosing said sensor, and a clamping nut, which interacts with said collet.

6. Measuring device according to claim 5, wherein one of said surfaces of said clamping piece and of said spacer, facing each other and orthogonal to the axis of said sensor, has a projecting lug and the other of said surfaces provided to receive said lug has depressions of variable depth, distributed in the circumferential direction, the height of said lug matching at least the depth of the deepest of said depressions.

7. Measuring device according to claim 6, wherein said clamping piece has a threaded lug, which is screwed into an adapter, said adapter is fastened in a spark plug or fuel injection nozzle bore of a cylinder head.

* * * * *

UNITED STATES PATENT AND TRADEMARK OFFICE
CERTIFICATE OF CORRECTION

PATENT NO. : 5,027,645

DATED : 07/02/91

INVENTOR(S) : Klaus Leitmeier; Gerhard Woss; Rudolph Zeiringer

It is certified that error appears in the above-identified patent and that said Letters Patent is hereby corrected as shown below:

ON THE TITLE PAGE:

[73] Assignee: AVL Gesellschaft für Verbrennungskraftmaschinen und Messtechnik M.B.H., Prof. Dr. h.c. Hans List.

Signed and Sealed this

Tenth Day of November, 1992

Attest:

DOUGLAS B. COMER

Attesting Officer

Acting Commissioner of Patents and Trademarks

UNITED STATES PATENT AND TRADEMARK OFFICE
CERTIFICATE OF CORRECTION

PATENT NO. : 5,027,645

DATED : July 2, 1991

INVENTOR(S) : Klaus Leitmeier; Gerhard Wöss; Rudolph Zeiringer

It is certified that error appears in the above-identified patent and that said Letters Patent is hereby corrected as shown below:

On the Title page item

[73] Assignee: AVL Gesellschaft für

Verbrennungskraftmaschinen und Messtechnik M.B. H., Prof.

Dr. Dr. H.C. Hans List, Graz, Austria

This Certificate supersedes Certificate of Correction issued Nov. 10, 1992.

Signed and Sealed this

Twenty-second Day of December, 1992

*Attest:*

DOUGLAS B. COMER

*Attesting Officer*    Acting Commissioner of Patents and Trademarks